United States Patent
Zlatanovic et al.

(10) Patent No.: US 9,778,543 B1
(45) Date of Patent: Oct. 3, 2017

(54) PARAMETRIC MIXER HAVING TUNABLE GAIN BANDS AND METHOD FOR TUNING THE SAME

(71) Applicant: The United States of America as represented by the Secretary of the Navy, Washington, DC (US)

(72) Inventors: Sanja Zlatanovic, San Diego, CA (US); Joanna Ptasinski, La Jolla, CA (US)

(73) Assignee: The United States of America as represented by Secretary of the Navy, Washington, DC (US)

( * ) Notice: Subject to any disclaimer, the term of this patent is extended or adjusted under 35 U.S.C. 154(b) by 107 days.

(21) Appl. No.: 14/564,824

(22) Filed: Dec. 9, 2014

Related U.S. Application Data

(63) Continuation-in-part of application No. 14/231,367, filed on Mar. 31, 2014, now Pat. No. 9,140,914.

(51) Int. Cl.
*G02F 1/39* (2006.01)
*H01S 3/00* (2006.01)
*G02F 1/13* (2006.01)
*G02F 1/377* (2006.01)

(52) U.S. Cl.
CPC ............ *G02F 1/395* (2013.01); *G02F 1/1326* (2013.01); *G02F 1/377* (2013.01); *H01S 3/0092* (2013.01); *G02F 2001/392* (2013.01)

(58) Field of Classification Search
CPC .......... G02F 1/365; G02F 1/377; G02F 1/395; G02F 2001/392
USPC ........................................................ 359/332
See application file for complete search history.

(56) References Cited

U.S. PATENT DOCUMENTS

| 5,133,037 | A | * | 7/1992 | Yoon | G02F 1/065 |
| | | | | | 359/332 |
| 5,361,320 | A | * | 11/1994 | Liu | G02B 6/032 |
| | | | | | 385/125 |
| 5,546,220 | A | * | 8/1996 | Endo | G02F 1/377 |
| | | | | | 359/328 |

(Continued)

FOREIGN PATENT DOCUMENTS

| JP | 2004054197 A | * | 2/2004 | G02B 6/12 |
| KR | 2009002836 A | * | 1/2009 | G02B 6/12 |

OTHER PUBLICATIONS

Brekke et al.; Parametric four-wave mixing using a single cw laser; Optics Letters vol. 38, No. 12; Jun. 14, 2013.

(Continued)

*Primary Examiner* — Daniel Petkovsek
(74) *Attorney, Agent, or Firm* — SPAWAR Systems Center Pacific; Kyle Eppele; J. Eric Anderson

(57) ABSTRACT

A tunable parametric mixer comprising a pump laser, a nonlinear waveguide, and a refractive index tuner. The pump laser is configured to generate pump photons. The nonlinear waveguide comprises a cladding and a core. The core is made of nonlinear optical material and the cladding in made of a material with a tunable index of refraction. The nonlinear waveguide is configured to convert the pump photons into signal and idler photons. The refractive index tuner is configured to change the refractive index of the cladding to dynamically tune the dispersion properties of the nonlinear waveguide in order to alter a spectral location of a gain band of the parametric mixer.

6 Claims, 4 Drawing Sheets

(56) References Cited

U.S. PATENT DOCUMENTS

| | | | |
|---|---|---|---|
| 6,927,895 B2* | 8/2005 | Ju | G02F 1/3775 |
| | | | 359/332 |
| 7,315,665 B1* | 1/2008 | Anderson | G02F 1/0136 |
| | | | 349/18 |
| 8,482,847 B2 | 7/2013 | Kuo et al. | |
| 8,989,523 B2* | 3/2015 | Anderson | G02F 1/295 |
| | | | 385/3 |
| 2002/0131694 A1* | 9/2002 | So | G02F 1/0115 |
| | | | 385/27 |
| 2014/0132893 A1* | 5/2014 | Baets | G02F 1/133788 |
| | | | 349/94 |

OTHER PUBLICATIONS

Foster et al.; Broadband Optical Parametric Gain on a Silicon Photonic Chip; Nature vol. 441; Jun. 22, 2006.

Sang et al.; High-Repetition-Rate Pulsed-Pump Optical Parametric Amplification in Silicon Waveguides; IEEE, OFC/NFOEC; Jan. 2008.

Wikipedia; Optical Parametric Oscillator; viewed online at http://en.wikipedia.org/wiki/Optical_parametric_oscillator on Sep. 9, 2014.

* cited by examiner

PARAMETRIC MIXER HAVING TUNABLE GAIN BANDS AND METHOD FOR TUNING THE SAME

CROSS-REFERENCE TO RELATED APPLICATION

This application is a continuation-in-part of prior application U.S. application Ser. No. 14/213,367, filed 31 Mar. 2014, titled "Apparatus and Method for Stabilizing the Temperature of a Photonic Circuit", now issued as U.S. Pat. No. 9,140,914, which application is hereby incorporated by reference herein in its entirety for its teachings, and referred to hereafter as "the parent application."

FEDERALLY-SPONSORED RESEARCH AND DEVELOPMENT

The United States Government has ownership rights in this invention. Licensing and technical inquiries may be directed to the Office of Research and Technical Applications, Space and Naval Warfare Systems Center, Pacific, Code 72120, San Diego, Calif., 92152; voice (619) 553-5118; sscpac_t2@navy.mil. Reference Navy Case Number 102779.

BACKGROUND OF THE INVENTION

Parametric mixing involves the mixing of electromagnetic waves in an optically-nonlinear medium to generate waves with new wavelengths. Parametric mixers typically comprise high power pump lasers, a signal and a nonlinear waveguide. In the process of parametric mixing, the pumps' photons are annihilated and new ones are generated at the wavelength of the signal and idler. The wavelength of the idler corresponds to its photon energy that is determined directly from the energy conservation between pumps, signal and idler photons. Gain bands are a range of wavelengths in which idler power is higher than the power of the signal at the input to the parametric mixer. Location of the gain bands depends on the phase-matching condition that is determined by momentum conservation between pumps, signal and idler photons. Prior art approaches to altering the location of the gain bands involve tuning the pumps' wavelength, which require the existence of tunable pump lasers and are therefore limited to only those spectral ranges in which such tunable laser sources exist.

SUMMARY

Disclosed herein is a tunable parametric mixer comprising a pump laser, a nonlinear waveguide, and a refractive index tuner. The pump laser is configured to generate pump photons. The nonlinear waveguide comprises a cladding and a core. The core is made of nonlinear optical material and the cladding in made of a material with a tunable index of refraction. The nonlinear waveguide is configured to convert the pump photons into signal and idler photons. The refractive index tuner is configured to change the refractive index of the cladding to dynamically tune the dispersion properties of the nonlinear waveguide in order to alter a spectral location of a gain band of the parametric mixer.

The tunable parametric mixer disclosed herein may be tuned by first cladding a nonlinear medium with a material having a tunable index of refraction. The next step provides for directing signal and idler photons through the nonlinear medium. The next step provides for converting pump photons from a pump laser into signal and idler waves with wavelengths within gain bands. The next step provides for changing a refractive index of the cladding to dynamically tune dispersion properties of the nonlinear medium in order to alter a spectral location of the gain bands and therefore tune signal and idler wavelengths.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
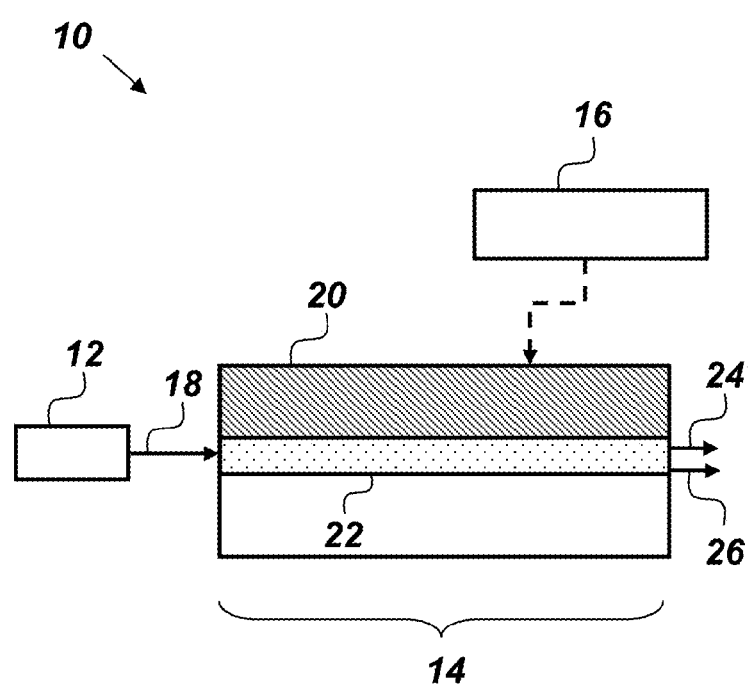
FIG. 1 is a cross-sectional side-view illustration of an embodiment of a tunable parametric mixer.

FIG. 1 is a cross-sectional side-view illustration of an embodiment of a tunable parametric mixer 10 that comprises, consists of, or consists essentially of a pump laser 12, a nonlinear waveguide 14, and a refractive index tuner 16. The pump laser 12 is configured to generate pump photons 18. The nonlinear waveguide 14 comprises a cladding 20 and a core 22. The core 22 is made of nonlinear optical material. The nonlinear waveguide 14 is configured to convert the pump photons 18 into signal and idler photons 24 and 26. The refractive index tuner 16 is configured to change the refractive index of the cladding 20 to dynamically tune the dispersion properties of the nonlinear waveguide 14 in order to alter a spectral location of a gain band of the parametric mixer 10.

Figure 2:
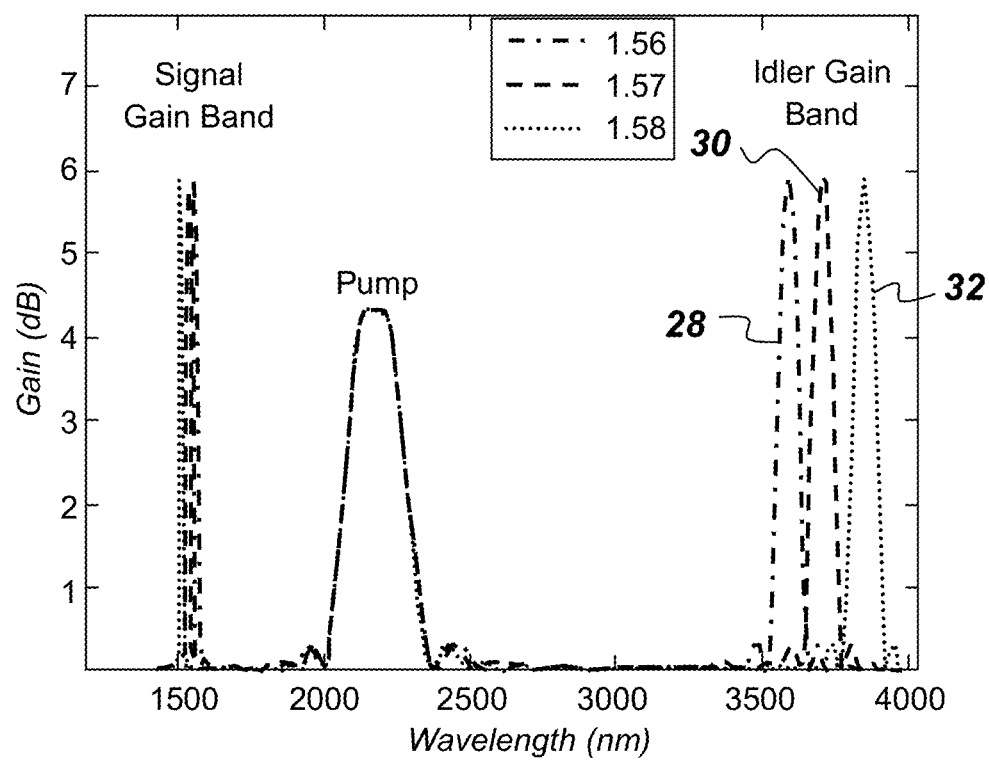
FIG. 2 is a plot of three simulated gain profiles of an embodiment of a parametric mixer.

FIG. 2 is a plot of three simulated gain profiles of an embodiment of the parametric mixer 10 at three different indices of refraction of the cladding 20. The simulated gain profiles shown in FIG. 2 are due to a third-order nonlinear process in a silicon embodiment of the waveguide 14 clad with the cladding 20. Each curve represents gain profile for a different index of refraction of the cladding 20. The wavelength of the pump laser 12 was fixed for each simulation. The dash-dot line 28 represents the gain profile of the parametric mixer 10 when the index of refraction of the cladding 20 is tuned to 1.56. The dashed line 30 represents the gain profile of the parametric mixer 10 when the index of refraction of the cladding 20 is tuned to 1.57. The dotted line 32 represents the gain profile of the parametric mixer 10 when the index of refraction of the cladding 20 is tuned to 1.58. As can be seen from FIG. 2, the gain band corresponding to the idler photons is tuned by almost 500 nm.

Change in the refractive index of the cladding 20 causes rearrangement of the guided mode between the cladding 20 and the core 22. This rearrangement is directly related to a change in group velocity and dispersion properties of the nonlinear waveguide 14. The dispersion properties determine the phase-matching condition and gain profile. Thus, the spectral location of the gain bands may be tuned by changing the refractive index of the cladding 20.

The cladding 20 may be tuned in real time by the refractive index tuner 16. This real-time tuning of the cladding 20 by the refractive index tuner 16 results in dynamic real-time control of the phase-matching condition for nonlinear processes in the nonlinear waveguide 14. Tuning of the gain bands of the parametric mixer 10 may be accomplished without the need for a tunable pump laser 12 to control the gain profile. Instead, the pump laser 12 may be fixed and the gain profile and the location of the gain bands may be changed by tuning the refractive index of the cladding 20.

The parametric mixer 10 does not require a tunable pump laser 12 to dynamically control the phase-mating condition in real-time. Rather, the parametric mixer 10 may comprise a pump laser 12 having a fixed operating frequency. Tuning of the parametric mixer 10 may be achieved by tuning the properties of a signal laser and a nonlinear medium comprising the nonlinear waveguide 14 and the cladding 20. The signal laser can be a broadband source or a tunable signal laser. Liquid crystals are one example of a material with a tunable index of refraction and may be used to actively modulate silicon photonic circuit components. Tunable optical circuit components are one of the essential technologies in the development of photonic analogues for classical electronic devices, since using one tunable device replaces many single wavelength devices and therefore minimizes the space occupied on-chip.

The cladding 20 may be any material having a tunable refractive index. Suitable examples of the cladding 20 include, but are not limited to, liquid crystals, electro-optic materials (Kerr effect or Pockels effect), magneto-optic materials, and optically tunable materials. Examples of electrically tunable refractive index materials include strained silicon, LiNbO3, LiTaO3, KNbO3, ZnTe, ZnSe, and nitrobenzene. Examples of magnetically tunable refractive index materials include CdMnTe, CdMnHgTe, and TdGdG crystals. Most common optically tunable materials consist of dye doped liquid crystals. Liquid crystals possess properties between those of a conventional liquid and those of a solid. To change the liquid crystal orientation an electric (direct current (DC) or alternating current (AC)), magnetic, or an optical field may be applied. Another method of liquid crystal tuning is through applying heat. Liquid crystal birefringence, $\Delta n = n_e - n_o$, can range from 0.05 to as high as 0.25 for commercially available nematics. Examples of some common, commercially available liquid crystals that may be used for the cladding 20 include, but are not limited to, 5CB, MBBA, E7, 8CB. The index of refraction of the cladding 20 in this embodiment may be changed by changing the orientation of the liquid crystal director axis. Suitable examples of liquid crystals that may be used for the cladding 20 include, but are not limited to, nematic liquid crystals, dye-doped liquid crystals, blue phase liquid crystals, polymer stabilized liquid crystals and cholesteric liquid crystals.

The pump laser 12 may be any continuous wave or pulsed laser source that has sufficiently high power to generate signal and idler photons in the nonlinear waveguide 14. Suitable examples of the pump laser 12 include, but are not limited to, a solid state laser, a gas laser, a dye laser, laser diodes, a distributed feedback laser, and an external cavity laser.

The nonlinear waveguide 14 may be any optical waveguide composed of material exhibiting $\chi^{(2)}$, $\chi^{(3)}$ or higher order optical nonlinearity. The waveguide core has a higher refractive index than the cladding and the substrate. Suitable examples of the nonlinear waveguide 14 include, but are not limited to, silicon, silicon nitride, silica, lithium niobate, III-V materials, and chalcogenide.

The refractive index tuner 16 may be any device, or assembly capable of dynamically changing the refractive index of the cladding 20. For example, in the embodiment of the parametric mixer 10 where the cladding 20 made of liquid crystals, the refractive index tuner 16 may be any device, or assembly capable of dynamically changing the orientation of the liquid crystal director axis. Suitable examples of the refractive index tuner 16 include, but are not limited to, a variable electric field generator, a variable temperature controller, a variable optical controller relying on polarized light, and a variable optical controller relying on unpolarized light.

Figure 3:
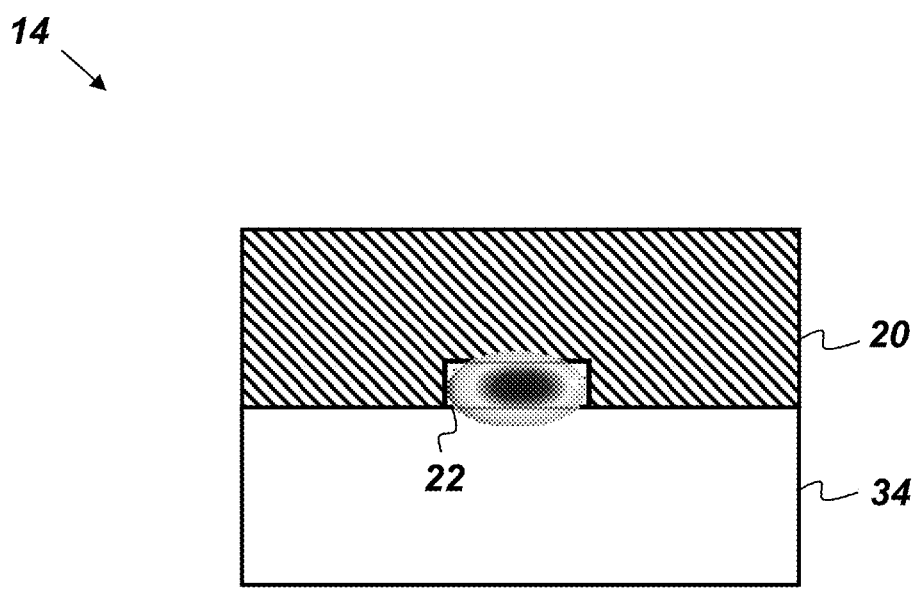
FIG. 3 is a cross-sectional front view of an embodiment of a nonlinear waveguide.

FIG. 3 is a cross-sectional front view of an embodiment of the nonlinear waveguide 14. In this embodiment, the nonlinear waveguide 14 comprises a silicon substrate 34. The parametric mixer 10 may be used to generate and tune light in the distant wavelength gain bands. The gain bands can be adjacent to or distant from the wavelength of the pump laser 12 depending on the dispersion of the nonlinear waveguide 14. As used herein, adjacent gain bands refer to those wavelength bands that are immediately adjacent to the wavelength of the pump laser 12 that are broadened or narrowed in response to a change in the refractive index of the cladding 20. As used herein, distant gain bands refer to the gain bands not immediately adjacent to the wavelength of the pump laser 12 that move in response to a change in the refractive index of the cladding 20.

Dispersion of the nonlinear waveguide 14 can be described using Taylor series coefficients of the propagation constant ($\beta 2$, $\beta 4$, . . . ). In one case where $\beta 2$ is negative and $\beta 4$ is positive, the parametric mixer 10 may have one gain band immediately adjacent to the wavelength of the pump laser 12 and may also have distant gain bands. In another case when $\beta 2$ is positive and $\beta 4$ is negative, the parametric mixer 10 may have only distant gain bands. To generate widely tunable light sources in the bands far away from the wavelength of the pump laser 12, the location of the distant gain bands needs to be tunable. The parametric mixer 10 does not need a tunable pump laser to alter the location of the distant gain bands and thus may be used to dynamically tune the location of the distant gain bands by changing the dispersion properties of the nonlinear waveguide 14. The phase-matching condition depends on indices of refraction of both the core 22 and the cladding 20. These two properties determine effective index of refraction at different wavelengths. Changing the refractive index of the cladding 20 results in changing the dispersion properties of the nonlinear waveguide 14. In turn, that results in changing the location of gain bands for which the phase-matching condition is satisfied. Tuning the refractive index continuously results in tuning of the gain-bands. An example of such tuning is given in FIG. 2.

The nonlinear waveguide 14 may be composed of an optical waveguide having specific optical nonlinearity and dispersion properties and may be designed with a heterogeneous (multi-section) architecture supporting creation of optical shock waves, enhancing the efficiency of the nonlinear mixing. An example of the nonlinear waveguide 14 may be composed of cascaded sections of heterogeneous waveguides with lengths chosen to balance the effects of nonlinear chirping due to self-phase modulation and linear compression due to dispersion. Example waveguides used for nonlinear mixing include, but are not limited to, high index contrast silica single mode optical fiber (i.e., highly nonlinear fiber (HNLF)), photonic crystal fiber, microstructured fiber, chalcogenide fibers, small mode area Silicon Nitride, Silicon, and chalcogenide integrated optical waveguides. Example waveguides used for linear compression include, but are not limited to; single mode silica fibers and larger mode area (dilute) integrated optical waveguides. In a specific embodiment of the parametric mixer, the nonlinear waveguide is implemented with two silicon waveguide stages and one silicon nitride stage. The first stage may consist of silicon waveguide. The second stage, the compression stage of the nonlinear waveguide 14 may consist of silicon nitride fiber matching the frequency chirp induced in the first stage producing optical shock wave with high peak power. The third stage of the nonlinear waveguide 14, where substantial idler generating occurs, may consist of silicon waveguide.

The following is a detailed description of an example embodiment of the parametric mixer 10. In this embodiment, light from a high power external cavity laser is combined with a broadband signal source via use of optical filters such as a dichroic mirror and/or optical wavelength division multiplexers and is coupled into the nonlinear waveguide 14. The nonlinear waveguide 14, in this embodiment, consists of silicon dioxide substrate, silicon core and liquid crystal cladding. Signal and idler photons are generated from pump photons at wavelengths that fall within gain bands. The location of the gain bands and therefore signal and idler wavelengths is determined by the liquid crystal refractive index. The liquid crystal refractive index is tuned by means of an applied electric field. Tuning of refractive index results in tuning of the gain bands location and consequently in tuning of signal and idler wavelengths. Signal, idler and pump photons are exiting the waveguides. In this embodiment the cladding 20 consisted of liquid crystal E7.

Figure 4:
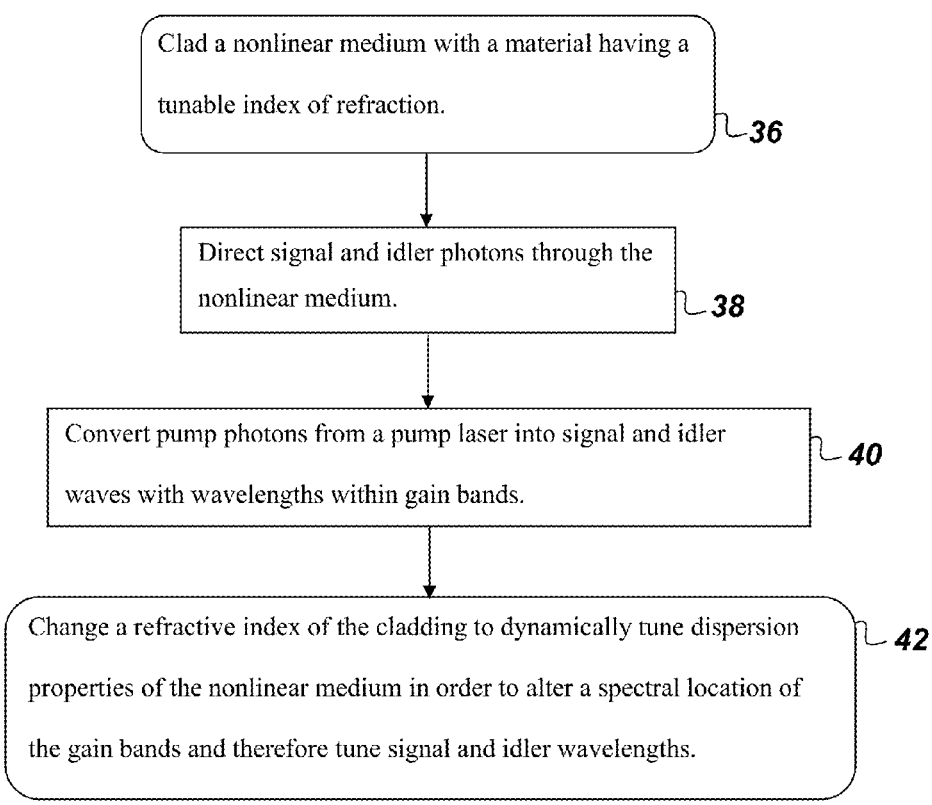
FIG. 4 is a flowchart showing steps that may be taken for tuning a spectral location of a gain band of an embodiment of a parametric mixer.

FIG. 4 is a flowchart showing steps that may be taken for tuning a spectral location of a gain band of an embodiment of the parametric mixer 10. The first step 36 provides for cladding the nonlinear medium 14 with the cladding material 20 having a tunable index of refraction. The second step 38 provides for directing signal and idler photons through the nonlinear medium 14. The third step 40 provides for converting pump photons from the pump laser 12 into signal and idler waves with wavelengths within gain bands. The fourth step 42 provides for changing a refractive index of the cladding 20 to dynamically tune dispersion properties of the nonlinear medium 14 in order to alter a spectral location of the gain bands and therefore tune signal and idler wavelengths.

The parametric mixer 10 may be integrated onto a complementary metal-oxide-semiconductor (CMOS)-compatible, photonic circuit. A circuit is CMOS-compatible if existing structures/devices of the circuit are not negatively affected by CMOS processes. In an embodiment of the parametric mixer 10, a liquid crystal cladding for the cladding 20 may be applied by first using a photolithographic method to create a fluidic chamber into existing cladding material of the photonic device. The next step provides for using a microfluidic method to direct the liquid crystals into the fluidic chamber. Suitable examples of microfluidic methods include, but are not limited to passive fluid control techniques relying on capillary forces, external actuation techniques centered on rotary drives applying centrifugal forces for fluid transport, and active fluid manipulation techniques utilizing micro pumps and/or micro valves. The next step provides for sealing the fluidic chamber using a cover slip bonded to the cladding material of the photonic device by oxygen plasma.

From the above description of the parametric mixer 10, it is manifest that various techniques may be used for implementing the concepts of the parametric mixer 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the parametric mixer 10 is not limited to the particular embodiments described herein, but is capable of many embodiments without departing from the scope of the claims.

We claim:

1. A tunable parametric mixer comprising:
    a pump laser configured to generate pump photons;
    a nonlinear waveguide comprising a cladding and a core, wherein the core is made of nonlinear optical material and the cladding is made of liquid crystals, and wherein the nonlinear waveguide is configured to convert the pump photons into signal and idler photons; and
    a refractive index tuner configured to change the refractive index of the cladding after fabrication of the nonlinear waveguide to dynamically tune the dispersion properties of the nonlinear waveguide in order to alter a spectral location of a gain band of the parametric mixer in real time, wherein the nonlinear optical material and the liquid crystals are such that the refractive index of the cladding is changed without changing the refractive index of the core, wherein the refractive index tuner is configured to change the refractive index of the cladding by changing the orientation of the liquid crystals, and wherein the refractive index tuner is a variable temperature controller configured to alter the temperature of the liquid crystals.

2. The parametric mixer of claim 1, wherein the pump laser has a fixed wavelength and is not configured to be tunable.

3. The parametric mixer of claim 1, wherein the gain band is a distant gain band.

4. The parametric mixer of claim 1, wherein the liquid crystals are selected from a group consisting of nematic liquid crystals, dye-doped liquid crystals, blue phase liquid crystals, polymer stabilized liquid crystals, and cholesteric liquid crystals.

5. The parametric mixer of claim 1, wherein the nonlinear waveguide comprises:
    a first stage configured to receive the pump photons, wherein the first stage consists of a silicon waveguide that induces a frequency chirp;
    a compression stage consisting of silicon nitride fiber designed to match the frequency chirp induced in the first stage so as to produce an optical shock wave; and
    a third stage consisting of a silicon waveguide configured to generate idler photons.

6. The parametric mixer of claim 1, wherein the parametric mixer is integrated onto a complementary metal-oxide-semiconductor (CMOS)-compatible, photonic circuit, wherein the liquid crystals are contained within a fluidic chamber photolighographically-created in cladding material of the photonic circuit, wherein the liquid crystals are sealed within the fluidic chamber by a cover slip bonded to the cladding material of the photonic device by oxygen plasma.

\* \* \* \* \*